United States Patent
Morizur et al.

(10) Patent No.: US 10,324,286 B2
(45) Date of Patent: Jun. 18, 2019

(54) DEVICE FOR PROCESSING LIGHT/OPTICAL RADIATION, METHOD AND SYSTEM FOR DESIGNING SUCH A DEVICE

(71) Applicant: CAILABS, Rennes (FR)

(72) Inventors: Jean-François Morizur, Rennes (FR); Guillaume Labroille, Rennes (FR); Nicolas Treps, Paris (FR)

(73) Assignee: CAILABS, Rennes (FR)

( * ) Notice: Subject to any disclaimer, the term of this patent is extended or adjusted under 35 U.S.C. 154(b) by 0 days.

(21) Appl. No.: 15/113,761

(22) PCT Filed: Jan. 15, 2015

(86) PCT No.: PCT/EP2015/050711
§ 371 (c)(1),
(2) Date: Jul. 22, 2016

(87) PCT Pub. No.: WO2015/113831
PCT Pub. Date: Aug. 6, 2015

(65) Prior Publication Data
US 2017/0010463 A1   Jan. 12, 2017

(30) Foreign Application Priority Data
Jan. 30, 2014   (FR) ..................... 14 50715

(51) Int. Cl.
*G02B 27/00* (2006.01)
*G02B 26/06* (2006.01)
*G02B 17/00* (2006.01)

(52) U.S. Cl.
CPC ....... *G02B 27/0068* (2013.01); *G02B 17/004* (2013.01); *G02B 26/06* (2013.01); *G02B 27/0087* (2013.01)

(58) Field of Classification Search
CPC .. G02B 27/0068; G02B 17/004; G02B 26/06; G02B 27/0087
(Continued)

(56) References Cited

U.S. PATENT DOCUMENTS 5,058,123 A   10/1991   Yasui et al.
5,586,139 A   12/1996   Takenaka et al.
(Continued)

FOREIGN PATENT DOCUMENTS

CN   101521351   9/2009
CN   102280809   12/2011
(Continued)

OTHER PUBLICATIONS

Morizur et al., "Programmable Unitary Spatial Mode Manipulation", Journal of the Optical Society of America A (2010), 27(11), pp. 2524-2531.
French Search Report from French Patent Application No. 1450715, dated Oct. 16, 2014.
International Search Report from International Patent Application No. PCT/EP2015/050711, dated Apr. 7, 2015.
(Continued)

*Primary Examiner* — Wen Huang
(74) *Attorney, Agent, or Firm* — TraskBritt (57) ABSTRACT

A device is provided for processing a light/optical radiation including at least two reflective optical elements defining a multi-pass cavity so that at least one of the optical elements reflects the light radiation at least twice, at at least two different reflection positions, and including at least one element, called a corrective element, having at least one position, called a corrective position, producing a reflection or a transmission of the optical radiation, and the surface of which is irregular so that the spatial phase profile of the corrective position has a different phase shift for several different reflection/transmission points of the corrective position.

14 Claims, 3 Drawing Sheets

(58) Field of Classification Search
USPC .......................................................... 359/577
See application file for complete search history.

(56) References Cited

U.S. PATENT DOCUMENTS

| | | | |
|---|---|---|---|
| 6,134,259 | A | 10/2000 | Danziger et al. |
| 6,370,166 | B1 | 4/2002 | Akaoka et al. |
| 6,430,328 | B1 | 8/2002 | Culver et al. |
| 7,118,216 | B2 | 10/2006 | Roorda |
| 7,590,156 | B1 * | 9/2009 | Richardson ........... H01S 3/1118 372/11 |
| 2014/0002892 | A1 | 1/2014 | Russbuldt et al. |
| 2014/0118811 | A1 | 5/2014 | Morizur et al. |

FOREIGN PATENT DOCUMENTS

| | | |
|---|---|---|
| DE | 10203864 A1 | 8/2003 |
| EP | 0979546 | 2/2000 |
| JP | 1982-190382 A | 11/1982 |
| JP | 1989-064278 A | 3/1989 |
| JP | 1989-194375 A | 8/1989 |
| JP | 1996-021964 A | 1/1996 |
| JP | 1998-510099 A | 9/1998 |
| JP | 2000-506676 A | 5/2000 |
| JP | 2000-174365 A | 6/2000 |
| JP | 2006-058009 A | 8/2004 |
| JP | 2010-040784 A | 2/2010 |
| JP | 2014-513281 A | 5/2014 |
| WO | 1997/034344 | 9/1997 |
| WO | 2012085046 A1 | 6/2012 |
| WO | 2012/129458 A1 | 9/2012 |

OTHER PUBLICATIONS

Armstrong et al, Programmable Multimode Quantum Networks, Nature Communications, Aug. 28, 2012, 8 pages.

Hsu et al., Optical Pattern Recognition via Adaptive Spatial Homodyne Detection, J. Opt. Soc. Am. A, vol. 27, No. 12, (Dec. 2010), pp. 2583-2587.

International Written Opinion for International Application No. PCT/EP2015/050711 dated Apr. 7, 2015, 9 pages.

Janousek et al., Optical Entanglement of Co-Propagating Modes, Nature Photonics, vol. 3, Jun. 21, 2009, pp. 399-402.

Morizur et al., Spatial Reshaping of a Squeezed State of Light, Eur. Phys. J. D, vol. 61, (2011), pp. 237-239.

Sakamaki et al., New Optical Waveguide Design Based on Wavefront Matching Method, Journal of Lightwave Technology, vol. 25, No. 11, (Nov. 2007), pp. 3511-3518.

Vagner et al, Entangling the Spatial Properties of Laser Beams, Science, vol. 321, www.sciencemag.org, (Jul. 2008), pp. 541-543.

Morizur Jean-Fran, 3 Modes Transmission using Hybrid Separation with High Mode Selectivity and Low Losses Spatial Mode Multiplexer, The European Conference on Optical Communication (ECOC), Dec. 31, 2014, URL, https://ieeexplore.ieee.org/stamp/stamp.jsp?tp=&arnumber=6964119, abstract only.

Japanese Search Report for Japanese Application No. 2016567142, dated Oct. 24, 2018, 27 pages with translation.

Japanese Office Action for Japanese Application No. 2016567142, dated Oct. 30, 2018, 8 pages with translation.

Chinese Supplementary Search Report from Chinese Application No. 201580006509.X, dated Oct. 31, 2018, 2 pages.

Chinese First Office Action with Chinese Search Report from Chinese Application No. 201560006509.X, dated Feb. 2, 2018, 12 pages.

\* cited by examiner

DEVICE FOR PROCESSING LIGHT/OPTICAL RADIATION, METHOD AND SYSTEM FOR DESIGNING SUCH A DEVICE

PRIORITY CLAIM

This application is a national phase entry under 35 U.S.C. § 371 of International Patent Application PCT/EP2015/050711, filed Jan. 15, 2015, designating France and published as International Patent Publication WO 2015/113831 A1 on Aug. 6, 2015, which claims the benefit under Article 8 of the Patent Cooperation Treaty to French Patent Application Serial No. 1450715, filed Jan. 30, 2014.

TECHNICAL FIELD

This disclosure relates to a device for processing a light/optical radiation, in particular by a succession of propagations and modifications of the spatial phase of the light radiation. It also relates to a method and a system for designing such a device.

The field of the disclosure is the field of processing optical radiation and, in particular, the field of processing optical radiation requiring a succession of propagations of the light radiation.

BACKGROUND

Document WO 2012/085046 A1 describes a system for correcting the effect of a diffusing medium on optical radiation having propagated in this diffusing medium, or in order to transform arbitrarily the spatial properties of optical radiation. It relates to a system for processing the light radiation.

The system described in this document comprises a plurality of optical means (phase plates or spatial phase modulators) separate from each other, the phase profile of which can be adjusted individually during an optimization step, and which allows each to modify the spatial phase of the light radiation which passes through them or which is reflected on them. It is the sequence of these spatial phase modifications of the light radiation separated by propagations that makes it possible, in general terms, to process the light radiation.

More generally, the optical systems provided for processing a light radiation comprise a plurality of optical means separate from each other, each carrying out a given processing on the optical radiation.

These optical systems, which comprise several optical means making it possible to modify the phase profile of the radiation, and in which the optical radiation carries out a succession of propagations, have a major drawback. In these systems, the positioning of the optical means with respect to each other and with respect to the light radiation must be very accurate, typically of the order of a micron, which can be difficult to achieve, time-consuming to assemble, and increase the requirements for rigidity of the mounting. Poor positioning of an optical element causes degradation of the processing carried out on the optical radiation. Thus, the optical radiation at the output of the processing device then degrades. This degradation can take the form, for example, of a loss of intensity or unwanted spatial deformation of the output radiation.

The purpose of the disclosure is to overcome the aforementioned drawbacks.

A further purpose of the disclosure is to propose a device for processing optical radiation that is easier to construct.

Yet a further purpose of the disclosure is to propose a device for processing optical radiation that is quicker to construct.

Finally, a further purpose of the disclosure is to propose a device for processing optical radiation that is more resistant to impacts and vibrations.

BRIEF SUMMARY

The disclosure makes it possible to achieve at least one of the aforementioned purposes by a device for processing a light radiation comprising at least two reflective optical elements defining a multi-pass cavity so that at least one of the optical elements reflects the light radiation at least twice, in particular at at least two different reflection positions, characterized in that it comprises at least one element, called a corrective element, having at least one position, a called corrective position, producing a reflection or a transmission of the optical radiation, the surface of which is irregular so that the spatial phase profile of the corrective position has a different phase shift for several different reflection/transmission points of the corrective position.

In other words, a corrective position modifies the phases of at least two spatial components of light radiation differently.

Thus, the device, according to the disclosure, processes a light or optical radiation by a multi-pass cavity defined in a fixed manner and by a low number of optical elements, in which the light radiation is reflected a plurality of times. The spatial phase of the light radiation is modified during at least one reflection or transmission on at least one corrective element.

As a result, the device, according to the disclosure, carries out with one and the same fixed light, one or more spatial phase modifications of the light radiation.

More generally, the device, according to the disclosure, makes it possible to carry out a plurality of spatial phase modifications of the light radiation with one and the same fixed optical element, being capable of presenting different phase profiles for different reflection or transmission positions, while the systems of the state of the art envisage using as many optical elements as there are modifications of the spatial phase of the light radiation.

The device, according to the disclosure, is easier to install, to use, and quicker to configure, as the number of optical elements to be positioned in relation to each other and with respect to the optical radiation is lower. Moreover, the low number of optical elements makes the device, according to the disclosure, more cost-effective to manufacture and allows the rigidity and solidity of the final system to be improved.

Of course, as this is a multi-pass cavity, the optical radiation is reflected on each reflective element in turn. In other words, two reflections of the optical radiation on one of the reflective optical elements defining the multi-pass cavity are separated by one reflection on the other one of the reflective optical elements defining the multi-pass cavity.

In this disclosure, the "spatial phase of the radiation" is defined by the phases of all of the spatial components of the radiation.

In addition, the "spatial phase profile of a corrective position" (reflection or transmission) is defined by all of the spatial phase shifts (modifications of the spatial phase) contributed by all of the reflection or transmission points of the corrective position on the different spatial components of the light radiation during one and the same reflection or transmission of the radiation on the corrective position. The phase profile can be very simple in the case of a reflection on a plane mirror.

Moreover, according to the disclosure, a corrective position can produce either a reflection of the radiation or a transmission of the radiation.

Each reflective optical element (from the at least two reflective optical elements defining a multi-pass cavity) reflects the light radiation preferably a plurality of times (preferably at least four times, preferably at least six times).

According to the disclosure, the irregularities of a corrective position can be obtained:
- by modifying the depths of the reflection or transmission surface by etching of the surface or deposition of a resin on the surface, in which case the depth of reflection or of transmission is modified, and/or
- by depositing on, or by producing, the corrective position with a material modulating the phase of the spatial components of the radiation, in which case the depth of reflection or of transmission is not modified, for example, with liquid crystals.

According to a preferred but non-limitative embodiment, the irregularities of a corrective position can have spatial structures at least 5 times smaller than the total size of the corrective position.

Advantageously, at least one optical corrective element can be formed by one of the reflective optical elements defining the multi-pass cavity. In this case, the number of optical elements of the device, according to the disclosure, is reduced, as one and the same optical element is both corrective and defines the multi-pass cavity.

According to a particular embodiment, the device, according to the disclosure, can comprise a single corrective element corresponding to one of the reflective optical elements defining the multi-pass cavity. Thus, the device, according to the disclosure, is simpler to configure and less expensive as it requires a single optical element modifying the spatial phase of the radiation that also defines the multi-pass cavity.

According to another particular embodiment, the device, according to the disclosure, can comprise two corrective elements corresponding respectively to the reflective optical elements defining the multi-pass cavity. In this case, each reflective optical element defining the multi-pass cavity comprises at least one corrective reflection position modifying the spatial phase of the radiation.

In this version, the device, according to the disclosure, makes it possible to carry out a modification of the spatial phase of the light radiation by means of the two reflective elements defining the multi-pass cavity. Thus, it is possible to carry out more complete processing of the light radiation with a smaller number of reflections in the multi-pass cavity. As a result, in this version, the device, according to the disclosure, carries out processing of the light radiation while minimizing the number of optical elements required.

According to the disclosure, at least one corrective element can be placed in the multi-pass cavity and be different from the reflective optical elements defining the multi-pass cavity.

In this case, at least one of the reflective optical elements defining the multi-pass cavity can also be corrective. Alternatively, it is possible for the reflective optical elements defining the multi-pass cavity not to be corrective.

In a preferred version of the device, according to the disclosure, at least two, in particular all, the reflection positions of at least one corrective element are corrective.

Thus, each corrective position has an irregular reflection or transmission surface so that the spatial phase profile of each corrective position has a different phase shift for several points of reflection or of transmission of the corrective position.

In this version, the device, according to the disclosure, makes it possible to carry out a modification of the spatial phase of the light radiation during several, in particular all, the reflections or transmissions, on the corrective element. Thus, it is possible to carry out more complete and more complex processing of the light radiation in the multi-pass cavity.

Advantageously, at least two corrective positions of one and the same corrective element have different phase profiles. Thus, the device makes it possible to modify differently the spatial phase of the radiation during reflections or transmissions on these two corrective positions of one and the same corrective optical element.

Alternatively or in addition, at least two corrective positions of one and the same corrective element have identical phase profiles. Thus, the device makes it possible to modify identically the spatial phase of the radiation during reflections or transmission on these two corrective positions of one and the same corrective optical element.

Moreover, at least two corrective positions of two different optical corrective elements may have identical or different spatial phase profiles.

According to an embodiment, at least one optical corrective element can be a phase plate.

Advantageously, at least one corrective optical element can be a phase plate having at least two different spatial phase profiles for at least two corrective positions.

In this case, the phase plate covers at least two different corrective positions. Each part of the phase plate corresponding to a corrective position has a desired spatial phase profile for this corrective position, which can be different from the desired spatial phase profile for another corrective position covered by the phase plate. Thus, the single phase plate covering several corrective positions comprises at least two parts having different spatial phase profiles. In this embodiment, the construction of the device, according to the disclosure, is facilitated because one single phase plate is manipulated and positioned in the multi-pass cavity.

According to an embodiment, the phase plate can be an etched mirror, but can also be a resin deposited on a substrate.

Advantageously, at least one corrective optical element can be a spatial phase modulator having at least two different spatial phase profiles for at least two corrective positions.

In this case, the spatial phase modulator covers at least two different corrective positions. Each part of the spatial phase modulator corresponding to a corrective position has a desired spatial phase profile for this corrective position, which can be different from the desired spatial phase profile for another corrective position covered by the phase plate. Thus, the single spatial phase modulator covering several corrective positions comprises at least two parts having different spatial phase profiles. In this embodiment, the cost of the device, according to the disclosure, is reduced, as one single spatial phase modulator is required for the device.

According to an embodiment, the spatial phase modulator can be a mirror deformed by actuators, but can also be a liquid crystal array, the birefringence properties of which are controlled by an array of electrodes.

Moreover, at least one reflective element defining the multi-pass cavity can comprise a through-hole making it possible to inject into the multi-pass cavity the optical radiation to be processed and/or to output the optical radiation from the multi-pass cavity after processing.

In a preferred, non-limitative embodiment of the device, according to the disclosure, one of the reflective optical elements can have a planar reflective surface and the other one of the reflective optical elements can have a curved reflective surface.

In particular, the planar surface can be a phase plate having one or more corrective reflection positions, the curved surface not applying any modification of the particular spatial phase of the light radiation other than the curvature mentioned.

In a preferred but non-limitative version of the device, according to the disclosure, the reflective optical elements defining the multi-pass cavity can be positioned in two directions perpendicular to each other. In this case, the device, according to the disclosure, can moreover comprise a mirror, called an intermediate mirror, placed facing the reflective optical elements at an angle of 45° with respect to the direction of each of the reflective optical elements, and reflecting 99% of the light radiation.

The intermediate mirror can be a corrective element or not.

In this non-limitative version, the device, according to the disclosure, is easier to configure, as it is easy to observe each of the reflective optical elements individually by observing, for example, the 1% of the light radiation that passes through the intermediate mirror.

In this version of the device, according to the disclosure, the multi-pass cavity is called "angled."

According to another aspect of the disclosure, a method is proposed for processing an optical radiation implementing a device according to the disclosure.

According to another aspect of the disclosure, a system is proposed for processing an optical radiation, the system comprising:
- a device according to the disclosure;
- a means for injecting the radiation into the corrective device, and
- a means for collecting the radiation at the output of the corrective device.

According to another aspect of the disclosure, a method is proposed for designing a device according to the disclosure, the method comprising the following steps:
- propagating the optical radiation to be processed and a radiation, called a reference radiation, in a multi-pass cavity defined between two reflective optical elements so that at least one of the optical elements reflects the optical radiation at least twice, in particular in at least two different reflection positions;
- optimizing an interference between the radiations, the optimization comprising at least one iteration of the following steps, carried out for at least one corrective position, on at least one corrective element:
  - determining a parameter relating to an interference between the radiations, for example, at the level of at least one corrective position, and
  - modifying the spatial phase profile of the at least one corrective position; and
  - configuring, at the level of at least one corrective position, the spatial phase profile, determined during the optimization step, and providing the optimized interference.

Each of the radiations, one to be processed and one reference, can be:
- a radiation effectively propagated in the multi-pass cavity, the reference radiation propagating in a direction of propagation opposite to the direction of propagation of the optical radiation to be processed; or
- a virtual radiation represented by a set of digital data. In this second case, the propagations of the radiations reflect the properties measured in the multi-pass cavity.

In the case in which the radiation to be processed and/or the reference radiation is virtual, the method can comprise a step for collecting data on the geometry of the multi-pass cavity by measuring the positions and the amplitude distribution of the reflections or transmissions of the reference radiation and/or the radiation to be processed, on the different optical elements in the absence of phase profile. Such a measurement can be carried out by a measurement means, such as a charge-coupled device (CCD) camera, placed facing or behind the reflection or transmission position.

In the case in which the multi-pass cavity is angled, the intermediate mirror can be partially reflective and the measurement means, for example, the CCD camera, can be placed behind the intermediate mirror facing the corrective position and, more generally, facing the reflecting or transmitting element on which the corrective reflection position is located.

The radiation to be processed and/or the reference radiation can be propagated in the multi-pass cavity by simulation on computerized means, the simulation taking account of the characteristics of the cavity, namely optical and physical characteristics of the optical elements defining the cavity, the length of the cavity, the relative angles of the different optical elements, etc.; characteristics calculated by using among others the information captured during the step of collection of data relating to the geometry of the multi-pass cavity.

The propagation through the cavity of the virtual reference radiation and the virtual radiation to be processed can be carried out in order to provide the characteristics of the reference radiation and the radiation to be processed at the level of each of the corrective positions within the cavity, namely the intensity and phase shift of each spatial component of the reference radiation and the radiation to be processed at the level of each of the corrective positions, so as to determine the correlation parameter of these two radiations as described above.

In addition, in the case in which the processing to be carried out is the correction of the effect of a diffusing medium on an optical radiation having passed through this medium, the radiation to be processed is obtained at the outlet of the diffusing medium and the reference radiation can advantageously be identical to the radiation to be processed before the radiation to be processed passed through the diffusing medium. In other words, the reference radiation can be identical to the radiation for processing, before the latter passes through the diffusing medium.

The correlation parameter can be determined at each reflection or transmission corrective position, in the multi-pass cavity, or solely at the level of a part only of the corrective positions in the cavity. For example, the correlation parameter can be measured only at the level of the corrective positions provided in order to apply processing to the optical radiation to be processed. This correlation parameter can be the spatial phase difference between the radiation to be processed and the reference radiation.

Alternatively, or in addition, the correlation parameter can be measured at the outlet of the multi-pass cavity.

Document WO 2012/085046 A1 comprises further details concerning the interference and optimization measurements.

The method for configuration of a corrective position (reflection or transmission) can comprise a step of measuring the characteristics of the radiation to be processed and the reference radiation at the level of this corrective position. Such a measurement can be carried out by a measurement means, such as a CCD camera, placed facing or behind the corrective position.

In the case in which the multi-pass cavity is angled, the intermediate mirror can be partially reflective and the measurement means, for example, the CCD camera, can be placed behind the intermediate mirror facing the corrective position and, more generally, facing the reflecting/transmitting element on which the corrective position is located.

For a given corrective position, the step of configuring the device for processing the light radiation, called optimized, determined during the optimization step, and providing the desired processing, can comprise the following steps:
production of a phase plate comprising the optimized phase profile or profiles,
positioning the phase plate at the corrective position(s).

The phase plate can be either an individual phase plate for a corrective position, or a phase plate common to several corrective positions and comprising different optimized phase profiles on different regions of its surface each corresponding to one corrective position.

According to yet another aspect of the disclosure, a system is proposed for designing a device according to the disclosure, the system comprising:
at least one means for propagating the radiation to be processed and a radiation, called reference radiation, in a multi-pass cavity defined between two reflective optical elements so that at least one of the optical elements reflects the optical radiation at least twice, in particular in at least two different reflection positions;
means for optimizing an interference between the radiations, the optimization being carried out either by digital or optical means, and comprising at least one iteration of the following steps, carried out for at least one corrective position, on at least one corrective element:
determining a parameter relating to an interference between the radiations, for example, at the level of at least one corrective position, and
modifying the spatial phase profile of the at least one corrective position; and
at least one means for configuring, at the level of at least one corrective position, the phase profile, determined during the optimization step, and providing the optimized interface.

BRIEF DESCRIPTION OF THE DRAWINGS

Other advantages and characteristics will become apparent on examination of the detailed description of embodiments, which are in no way limitative, and the accompanying diagrams, in which.

DETAILED DESCRIPTION

It is well understood that the embodiments that will be described hereinafter are in no way limitative. It is possible to envisage variants of the disclosure comprising only a selection of the characteristics described hereinafter, in isolation from the other characteristics described, if this selection of characteristics is sufficient to confer a technical advantage or to differentiate the disclosure with respect to the state of the art. This selection comprises at least one, preferably functional, characteristic without structural details, or with only a part of the structural details if this part alone is sufficient to confer a technical advantage or to differentiate the disclosure with respect to the state of the prior art.

In particular, all the variants and all the embodiments described can be combined together if there is no objection to this combination from a technical point of view.

In the figures, elements common to several figures retain the same reference.

Figure 1:
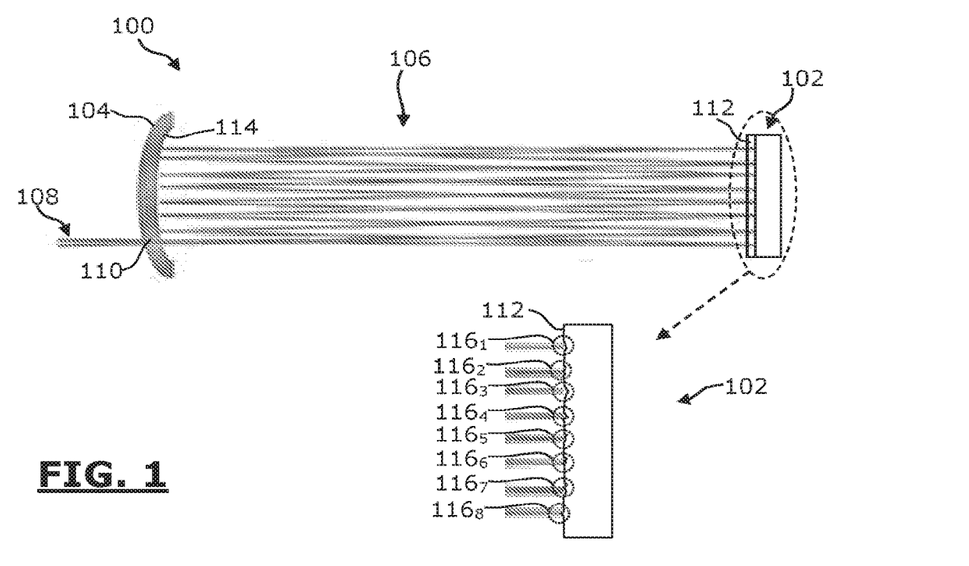
FIG. 1 is a diagrammatic representation of a non-limitative embodiment of a device according to the disclosure.

FIG. 1 is a diagrammatic representation of a first non-limitative example of a device for processing a light radiation.

The device 100 shown in FIG. 1 comprises two reflective optical elements 102 and 104 between them forming a multi-pass cavity 106 in which a light radiation to be processed 108 undergoes a plurality of reflections and propagations.

With a multi-pass cavity 106, the light radiation 108 encounters exactly the same (no more, no less) intermediate optical elements (there is no intermediate element in the case of FIG. 1) reflecting and/or transmitting it between each pair of successive reflections by means of the reflective elements 102, 104, i.e.:
for each path starting from a first reflective optical element 102 (from the at least two reflective optical elements) and going to a second reflective optical element 104 (from the at least two reflective optical elements), and
for each path starting from the second reflective optical element 104 and going to the first reflective optical element 102,
these intermediate optical elements preferably not comprising any lens and/or any polarizing element (cube or plate) changing the polarization of the light radiation 108.

The reflective element 104 comprises a through-hole 110 making it possible for the optical radiation to enter the multi-pass cavity 106 to be processed and to leave the cavity 106 after having been processed.

The reflective element 102 comprises a planar reflective surface 112 and the reflective element 104 comprises a concave or curved reflective surface 114.

The multi-pass cavity 106 defined by the mirrors 102 and 104 is arranged so that the light radiation 108 is reflected a plurality of times by each of the mirrors, at different positions, in turn. Thus, in the example shown, the plane mirror 102 reflects the optical radiation 108 eight times, at eight different reflection positions on the planar surface 112 and the curved mirror 104 reflects the optical radiation 108 seven times, at seven different reflection positions on the surface 114.

The reflective element 104 is formed by a curved or concave mirror and does not apply any modification to the spatial phase profile of the optical radiation 108 apart from its curvature.

The reflective element 102 is called corrective. This reflective element 102 is formed by a plane mirror the reflective surface 112 of which is deformed on the wavelength scale, applying a modification of the spatial phase of the optical radiation. To this end, the deformed plane mirror has an irregular surface at the level of each reflection position 116, so that each reflection position 116 is corrective and has a spatial phase profile modifying the spatial phase of the radiation 108. Thus, each reflection region/zone/position $116_1$-$116_8$ has different depths for at least two spatial components of the radiation 108 and carries out a modification of the spatial phase of the optical radiation 108, i.e., different phase shifts of at least two spatial components of the radiation 108.

Each reflective optical element 102, 104 is arranged in order to reflect the light radiation 108 a plurality of times (preferably at least four times, preferably at least six times).

The multi-pass cavity 106 is arranged so that the light radiation 108 goes back-and-forth several times between the (at least) two reflective optical elements 102, 104.

In the example shown in FIG. 1, the reflective element 104 is not corrective. Alternatively, the reflective element 104 can also be corrective, at least for a part of the reflection positions on this reflective element 104.

In the example shown in FIG. 1, the reflective element 102 is corrective for each reflection position on this reflective element 102. Alternatively, the reflective element 102 can be corrective, for only a part of the reflection positions on this reflective element 102.

In the example shown in FIG. 1, all the corrective reflection positions 116 are represented differently, i.e., with different spatial phase profiles. Alternatively, each corrective reflection position 116 can have one and the same irregularity, i.e., a phase profile identical to that of another corrective reflection position 116.

Figure 2:
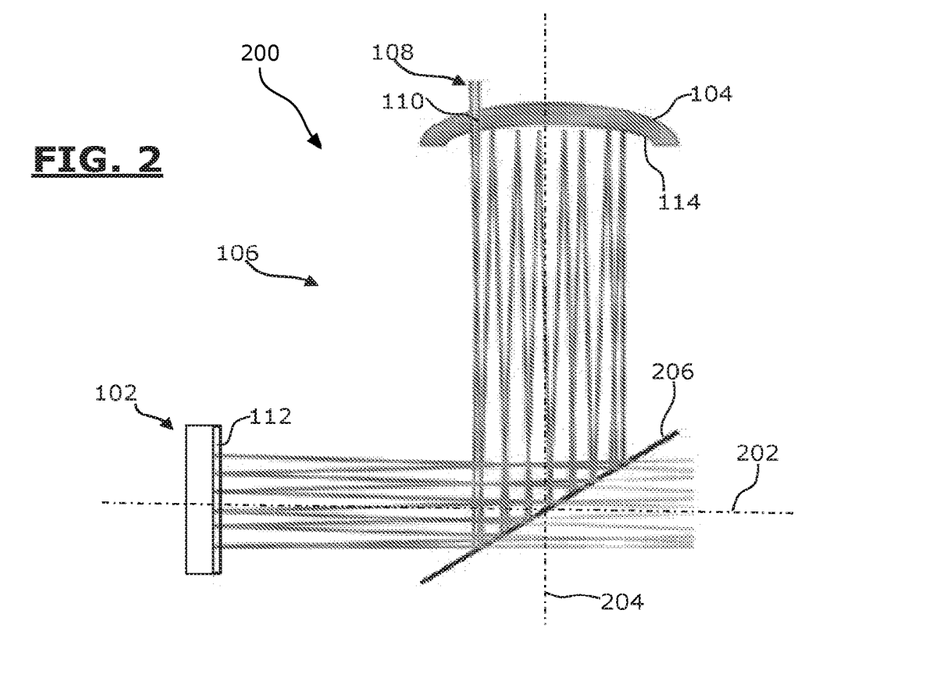
FIG. 2 is a diagrammatic representation of another non-limitative embodiment of a device according to the disclosure.

FIG. 2 is a diagrammatic representation of a second non-limitative example of a device for processing light radiation.

The device 200 shown in FIG. 2 comprises all the components of the device 100 in FIG. 1.

In the device 200, the reflective elements 102 and 104 are placed in two directions, respectively, 202 and 204, perpendicular to each other, while in FIG. 1 they are arranged in one and the same direction or in two directions parallel to each other. The multi-pass cavity 106 obtained with the device of FIG. 2 is called angled.

The device 200 also comprises an intermediate mirror 206, placed facing the reflective elements 102 and 104 at an angle of 45° with respect to each of the directions 202 and 204. The role of the intermediate mirror 206 is to direct the optical radiation 108 originating from one of the reflective elements 102 or 104 to the other one of the reflective elements 104 or 102.

The intermediate mirror 206 is a 99% reflective mirror. As a result, this mirror 206 allows 1% of the radiation 108 to pass, each time the latter is reflected on this intermediate mirror 206.

With a multi-pass cavity 106, the light radiation 108 encounters exactly the same (no more, no less) intermediate optical elements (intermediate element 206 in the case of FIG. 2) reflecting and/or transmitting it between each pair of successive reflections by the reflective elements 102, 104, i.e.:

for each path starting from the first reflective optical element 102 and going to the second reflective optical element 104, and for each path starting from the second reflective optical element 104 and going to the first reflective optical element 102, these intermediate optical elements preferably not comprising any lens and/or any polarizing element (cube or plate) changing the polarization of the light radiation 108.

Figure 3:
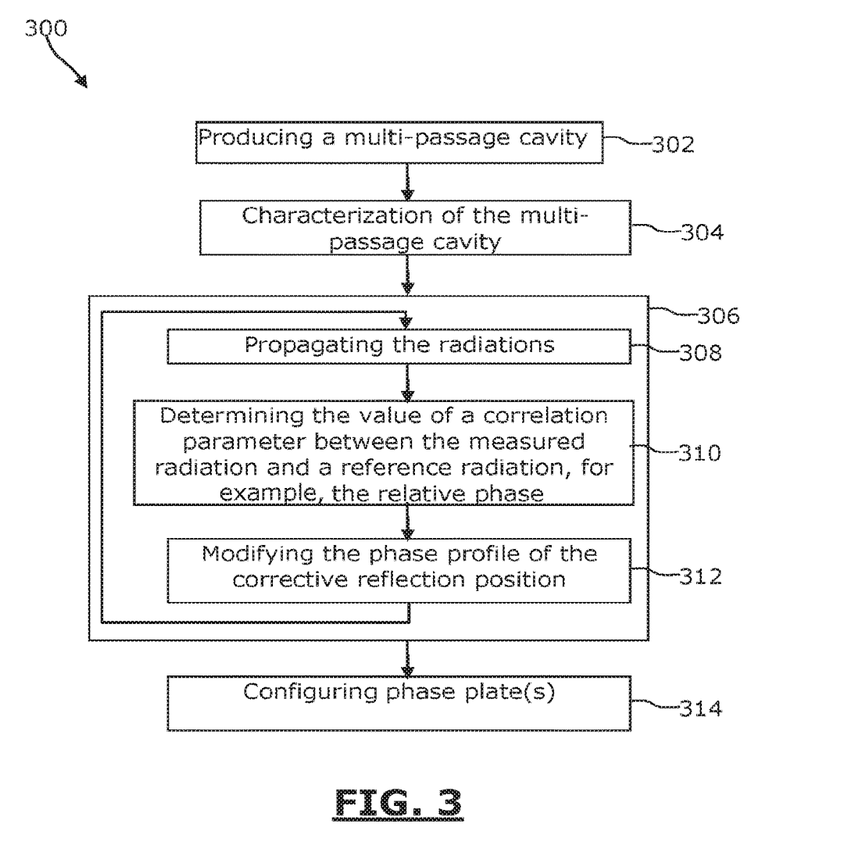
FIG. 3 is a representation in the form of a diagram of a non-limitative example of a method, according to the disclosure, for designing a device according to the disclosure.

FIG. 3 is a representation in the form of a diagram of a non-limitative example of a method according to the disclosure for designing a device according to the disclosure.

The method 300 comprises an initial step 302 of producing a multi-pass cavity, for example, the cavity 106, by combining the two mirrors 102 and 104.

The method then comprises a step 304 of characterizing the geometry of the measurements of the cavity, i.e., determining the geometrical characteristics of the cavity, of the reflection positions, etc. Such a step can be carried out by propagating a radiation in the cavity, for example, the radiation to be processed.

In a step 306, the method determines the optimized phase profiles for at least two corrective reflection positions on at least one of the reflective elements defining the multi-pass cavity. This step 306 comprises at least one iteration of the following steps carried out for each corrective reflection position concerned of each corrective reflective element:

a step 308 during which the radiation to be processed and the reference radiation are propagated digitally (in opposite directions) to the level of the corrective reflection position, taking account of the phase profiles already calculated for the other corrective reflection positions;

a step 310 during which the value of the relative phase between the reference radiation and the radiation to be processed is determined at the level of the reflection position; and a step 312 digitally modifying the phase profile at the level of the corrective reflection position in order to compensate the relative phase between the reference radiation and the radiation to be processed at the level of the reflection position.

Steps 308-312 are iterated as many times as necessary in order to obtain an optimized overlap value (spatial scalar product) of the radiations, for example, determined beforehand.

Iteration of these steps makes it possible to determine an optimized phase profile for each corrective reflection position concerned, making it possible to obtain an optimized correlation parameter between the radiation to be processed and a reference radiation.

During a step 314, carried out after step 306, one or more phase plates, comprising the optimized phase profile for each corrective reflection position, are printed on the reflective element concerned, for example, by etching of the reflective surface 112 of the mirror 102.

Figure 4:
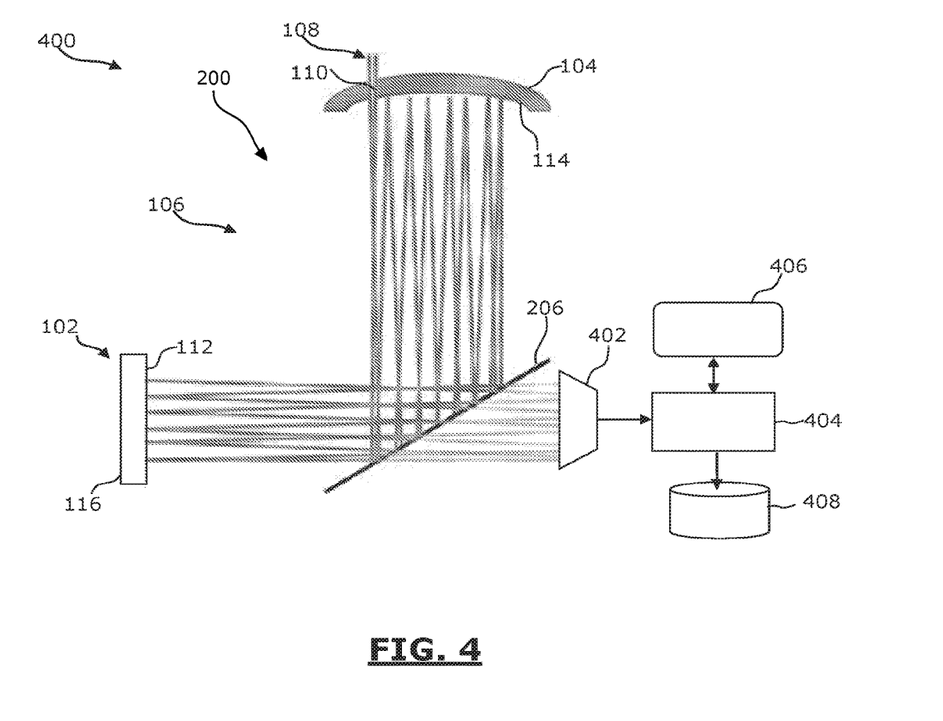
FIG. 4 is a diagrammatic representation of a non-limitative example of a system according to the disclosure for designing a device according to the disclosure.

FIG. 4 is a diagrammatic representation of a non-limitative example of a system according to the disclosure for designing a device according to the disclosure.

The system 400 comprises a CCD camera 402 making it possible to measure the radiation to be processed at the level of a plurality of reflection positions on a reflective element defining a multi-pass cavity, these measurements making it possible at the same time to characterize the radiation to be processed as well as the geometrical properties of the multi-pass cavity.

A module 404 makes it possible, by simulation, to apply different phase profiles for each of the corrective reflection positions concerned so as to determine the optimized phase profile for each corrective reflection position.

Finally, a module 406 makes it possible to simulate the propagation of the radiation to be processed and of the reference radiation within the multi-pass cavity in the presence of the phase profiles provided by the module 404, in order to determine the value of a correlation parameter between the radiation to be processed and the reference radiation in different corrective positions depending on:

measurements carried out by the CCD camera 402, in particular the characterization of the radiation to be processed and the geometry of the multi-pass cavity, and spatial phase profiles provided by the module 404, a virtual reference radiation, represented by a set of digital data.

Depending on the correlation parameter determined by the module 406, the phase profile at the position considered in the module 404 is modified.

When the module 406 determines an optimized value for the correlation parameter, the phase profiles determined by the module 404 providing this optimized value are stored in storage means 408.

These optimized phase profiles are then used in order produce/configure one or more phase plates, provided in order to be placed instead of the reflective element in question. Alternatively, it is possible to print the phase plate or phase plates directly on the reflective element in question, as described with reference to FIG. 1.

In FIG. 4, the system 400 is shown in combination with the device 200 in FIG. 2. In this configuration, the CCD camera 402 is positioned behind the intermediate mirror 206 and is focused on the reflective surface of the reflective element in question, namely the reflective surface 112 of the plane mirror 102.

However, it is also possible to use the system 400 in FIG. 4 to design a device according to the configuration shown in FIG. 1. In this configuration, the CCD camera 402 is positioned behind the reflective element in question, namely behind the mirror 102.

Of course, the disclosure is not limited to the examples that have just been described. For example, in the given examples the corrective element is an optical element defining the multi-pass cavity. Alternatively or in addition, it is possible to have at least one corrective optical element that is different from the reflective optical elements defining the multi-pass cavity and placed between these reflective elements, such a corrective optical element being an optical element reflecting or transmitting the optical radiation, such as, for example, the intermediate mirror 206 in FIG. 2.

In addition, in the examples given, the corrective positions are all positions reflecting the light radiation. Alternatively or in addition, it is possible to have at least one corrective position that carries out a transmission of the light radiation.

The invention claimed is:

1. A device for processing a light radiation comprising:
    at least two reflective optical elements defining a multi-pass cavity in which the light radiation travels back-and-forth so that each reflective optical element reflects the light radiation at least four times;
    at least one corrective element, comprising:
        one of the reflective optical elements defining the multi-pass cavity; and/or
        a corrective element placed in the multi-pass cavity and different from the reflective optical elements defining the multi-pass cavity;
    the at least one corrective element having at least one corrective position producing a reflection or a transmission of the light radiation and having an irregular surface so that the spatial phase profile of the at least one corrective position has a different phase shift for several different reflection/transmission points of the at least one corrective position, and wherein the irregular surface presents irregularities of the at least one corrective position having spatial structures at least five times smaller than the total size of the at least one corrective position; and
    wherein the device does not include any lens, polarizing element, or optical coupler between the at least two reflective optical elements defining the multi-pass cavity through which the light radiation passes as the light radiation is reflected within the multi-pass cavity.

2. The device according to claim 1, wherein at least one corrective optical element is one of the reflective optical elements defining the multi-pass cavity.

3. The device according to claim 1, wherein the device comprises at least two corrective elements corresponding respectively to the reflective optical elements defining the multi-pass cavity.

4. The device according to claim 1, wherein the at least one corrective element is placed in the multi-pass cavity and is different from the reflective optical elements defining the multi-pass cavity.

5. The device according to claim 1, wherein the at least one corrective element comprises a plurality of corrective positions and at least two of the corrective positions have different phase profiles.

6. The device according to claim 1, wherein the at least one corrective element comprises a plurality of corrective positions and at least two of the corrective positions have identical phase profiles.

7. The device according to claim 1, wherein at least one corrective optical element comprises at least one phase plate at a location of at least one corrective position.

8. The device according to claim 1, wherein the at least one corrective element comprises a single phase plate having at least two spatial phase profiles for at least two corrective positions.

9. The device according to claim 1, wherein the reflective optical elements defining the multi-pass cavity are positioned in two directions perpendicular to each other, the device also comprising a mirror placed facing the reflective optical elements, at an angle of 45° with respect to the direction of each of the reflective optical elements.

10. The device of claim 1, wherein one of the reflective optical elements comprises a planar reflective surface.

11. The device of claim 10, wherein one of the reflective optical elements comprises a curved reflective surface.

12. The device of claim 1, wherein at least one reflective element defining the multi-pass cavity comprises a through-hole through which radiation to be processed may be injected into the multi-pass cavity and/or through which radiation may be output from the multi-pass cavity after processing.

13. The device of claim 1, wherein the device does not include any intermediate optical element between the at least two reflective optical elements defining the multi-pass cavity through which the light radiation passes as the light radiation is reflected with the multi-pass cavity.

14. A device for processing a light radiation, comprising: a multi-pass cavity, defined by only two reflective optical elements, in which the light radiation travels back-and-forth at least four times between the two reflective optical elements during operation of the device, wherein one reflective optical element of the two reflective optical elements is a phase plate having a plurality of corrective positions, each corrective position of the plurality producing a reflection of the light radiation and having an irregular surface, such that a spatial phase profile of the corrective position has a different phase shift for several different reflection points of the corrective position, and wherein the irregular surface presents irregularities that have spatial structures at least five times smaller than the total size of the corrective position, and wherein the device does not include any intermediate optical element between the two reflective optical elements defining the multi-pass cavity in which the light radiation travels back-and-forth at least four times between the two reflective optical elements during operation of the device.

* * * * *